Patented Nov. 22, 1949

2,489,232

UNITED STATES PATENT OFFICE 2,489,232

SYNTHESIS OF BIOTIN

Moses Wolf Goldberg, Upper Montclair, and Leo H. Sternbach, Montclair, N. J., assignors to Hoffmann-La Roche Inc., Roche Park, Nutley, N. J., a corporation of New Jersey No Drawing. Application May 31, 1946, Serial No. 673,642

8 Claims. (Cl. 260—309)

Our invention relates to a new synthesis of d,l-biotin. The synthesis is characterized by the use of a meso-diaminosuccinic acid derivative as a starting material. This is converted into the corresponding imidazolidone-(2)-cis-4,5-dicarboxylic acid, then the sulfur-containing ring is formed, and finally the typical biotin side chain introduced.

Our synthesis differs thus in several respects from the two already published syntheses of biotin by Harris et al., J. Am. Chem. Soc., 66, 1756, 1757 (1945); 67, 2096 (1946), and by A. Grüssner, O. Schnider and J. P. Bourquin, Helv. Chim. Acta, 28, 517 (1945). An important point is, that our easily accessible starting material already contains the two amino groups in the same spatial arrangement as the two amino groups present (in substituted form) in the biotin molecule, the meso-configuration in diaminosuccinic acid derivatives corresponding to a cis-structure of the two amino groups in a ring compound (as in biotin). This approach to the synthesis of biotin is basically new. It is in contrast to the known syntheses, which introduce one or both amino groups at a later stage of the synthesis into a preformed sulfur-containing ring, an approach which permits formation of the corresponding cis- and trans-isomers. These must be separated, thus complicating the synthesis and affecting the overall yield of biotin.

Our process avoids the formation of the biologically inactive trans-isomers of biotin (allobiotin and epi-allobiotin), and gives as the final product, pure d,l-biotin.

The flow sheet shows the steps of the synthesis.

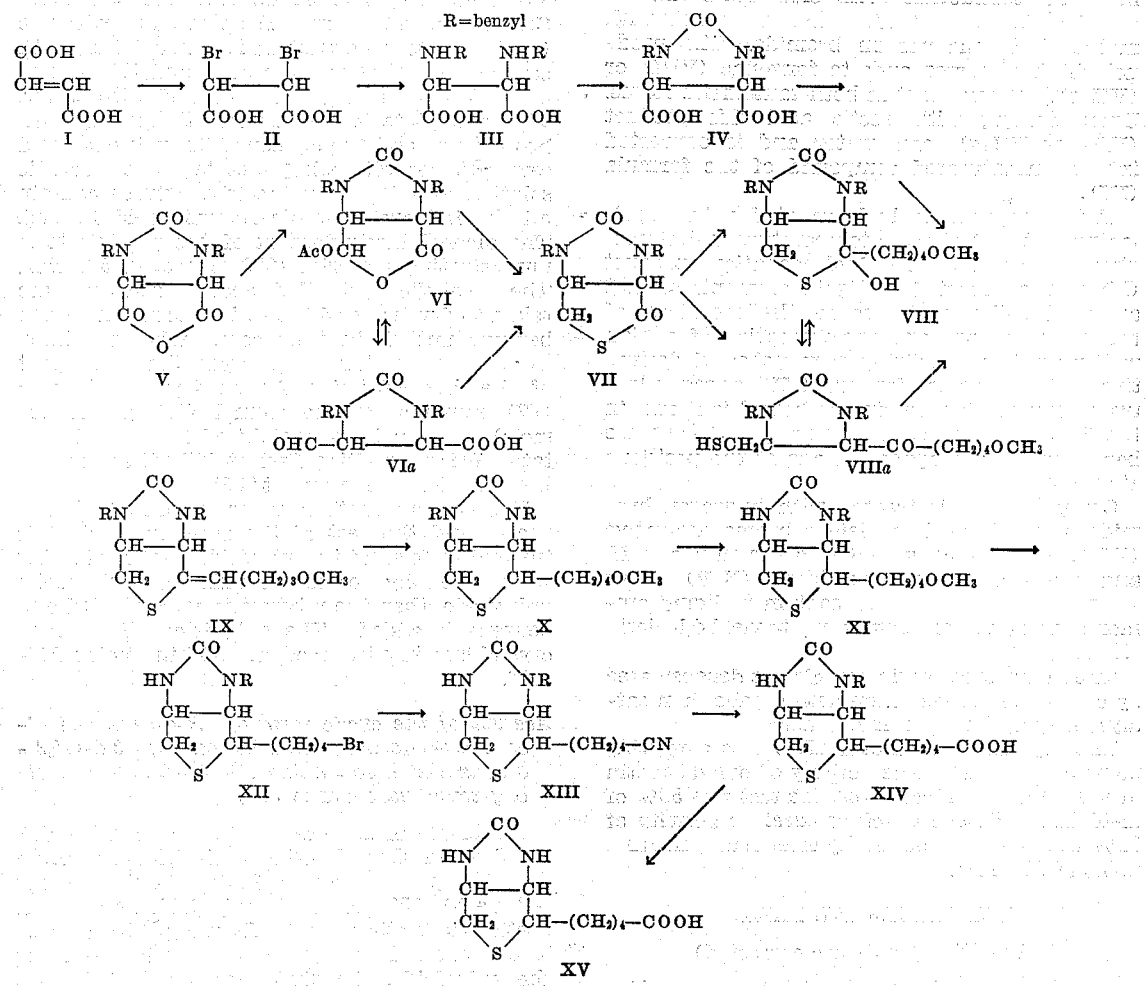

Fumaric acid (I) is brominated in the usual way, to yield meso-dibromosuccinic acid (II), which in turn can be easily converted into the known bis-benzylamino-succinic acid (III). This acid is reacted in alkaline solution with phosgene, to yield the 1,3-dibenzyl-imidazolidone-(2)-cis-4,5-dicarboxylic acid (IV). This compound and all the following ones except d,l-biotin are novel. The 1,3-dibenzyl-imidazolidone-(2)-cis-4,5-dicarboxylic acid (IV) is heated with acetic anhydride, and the anhydride (V) formed is reduced with zinc, acetic acid and acetic anhydride to yield in an unusual reaction the acetate of the cyclic form of the corresponding aldehydo acid, the 3,4(1',3'-dibenzyl-2'-keto-imidazolido)-2-keto-5-acetoxy-tetrahydro-furane (VI).

Compound (VI), or the corresponding free aldehydo acid (VIa), the 1,3-dibenzyl-cis-4-carboxy-5-formyl-imidazolidone-2, which can be obtained from the acetate (VI) by saponification, were found to be suitable materials for the introduction of the sulfur atom into the molecule. The acetate, or the free aldehydo acid, is treated with hydrogen chloride and hydrogen sulfide in an organic solvent; the mixture is concentrated in vacuo, and reacted with an alcoholic solution of potassium hydrosulfide. The reaction mixture is acidified in the cold, extracted with ether, the ether extract concentrated in vacuo, and the residue reduced with zinc and acetic acid. The reduced reaction mixture is filtered, the filtrate concentrated in vacuo, and the residue extracted with ether. The ether solution is then concentrated, and after 20-60 hours the thiolactone (VII) crystallizes out.

This thiolactone (VII) reacts very well with methoxybutyl-magnesium bromide. The product obtained corresponds to formulae (VIII) or (VIIIa). It can react in both tautomeric forms. Upon heating with acetic acid this product (VIII or VIIIa) loses water and is converted into an unsaturated compound of the formula (IX).

This compound is hydrogenated with a palladium catalyst at room temperature and atmospheric pressure. The hydrogenation product (X) is then reacted in liquid ammonia with 2 atoms of sodium which causes the loss of one of the benzyl groups and the formation of a high melting well crystallizing N-monobenzyl derivative (XI). Whereas formula (XI), et seq., illustrate compounds wherein the benzyl is shown in the 3' position, it is to be understood that the benzyl group can appear in one of the positions 1' and 3'.

Compound XI is treated with hydrogen bromide in acetic acid to yield a bromo derivative (XII), which is converted into the nitrile XIII, and finally into monobenzylbiotin (XIV). This compound is reacted with sodium in liquid ammonia, and loses its benzyl group to yield d,l-biotin (XV).

The monobenzylbiotin can also be debenzylated by catalytic hydrogenation with a palladium catalyst in presence of mineral acid.

The crystalline d,l-biotin (XV) has a melting point of 232-234°. The activity of our d,l-biotin in the *Saccharomyces cerevisiae* test was 50% of di-biotin; with *Lactobacillus casei* an activity of 51% was found. The methylester had a melting point of 134-136°.

EXPERIMENTAL PART (All melting points are corrected)

*Preparation of bis-benzylamino-succinic acid (III)*

To a warm solution of 300 grams meso-dibromo-succinic acid (prepared according to Org. Synth. Coll., vol. II, page 177) in 2 liters of absolute alcohol are added 900 cc. of benzylamine. The mixture is stirred and refluxed for 5-6 hours. 300 cc. of concentrated hydrochloric acid, 50 cc. of concentrated acetic acid, and 500 cc. of water are then added, and the slightly acidic mixture (pH 5.0) is concentrated, by distilling off 500-1000 cc. of alcohol. The reaction product is thus obtained in the form of an easily filterable precipitate. The mixture is kept overnight in the refrigerator, then the precipitate is filtered off and washed several times with water. If the precipitate is not white and does not filter well, it is dissolved in a hot solution of 114 grams potassium hydroxide in 1.5 liters of water. This solution is then decolorized with charcoal, filtered, boiled up, and treated with 170 cc. of concentrated acetic acid. The mixture is left for 1 hour on the steam-bath, and then kept overnight in the refrigerator. The reaction product, which is thus obtained in form of white crystals, is filtered off, washed with water and alcohol, and then dried. Melting point 224-225°.

*1,3-dibenzyl-imidazolidone-(2)-cis-4,5-dicarboxylic acid (IV) and its anhydride (V)*

To a stirred, ice cooled solution of 648 grams (1.98 moles) of bis-benzylaminosuccinic acid in 2 liters 3 N potassium hydroxide, are added in small portions (within 1½ hours) 1.6 liters of a 3.75 molar solution of phosgene in xylene (=6 moles $COCl_2$) and 2.7 liters 6 N potassium hydroxide (=14 moles). The mixture is then acidified with concentrated hydrochloric acid, and the formed precipitate filtered off and washed with water. The precipitate is then washed thoroughly with hot alcohol, and the aqueous filtrate is extracted several times with ethyl acetate. The alcoholic solution and the ethyl acetate extract contain all the imidazolidone-dicarboxylic acid formed. The alcohol insoluble part of the precipitate is pure starting material (220 grams=0.65 mole). The alcoholic and ethyl acetate solutions are taken to dryness, and the residue is refluxed with benzene until it becomes completely crystalline. The cooled mixture is filtered; the main part of the dibenzyl-imidazolidone-dicarboxylic acid (IV) remains on the funnel (283 grams=.08 mole). It can be recrystallized from ethyl acetate. Prisms, melting first at 167°, then resolidifying again and melting at 236°.

The benzene mother liquor is concentrated in vacuo, and the rest of the reaction product is isolated in form of its anhydride in the following way: The oily residue is refluxed with acetic anhydride, then the mixture is concentrated and benzene is added. The anhydride (V) formed crystallizes in nice needles. Melting point 236-237°.

*Acetate of the cyclic form of 1,3-dibenzyl-4-carboxy-5-formyl-imidazolidone-2; 3,4-(1',3'-dibenzyl-2'-keto - imidazolido) - 2-keto-5-acetoxy-tetrahydrofurane (VI)*

A mixture of 100 grams of the anhydride (V) of 1,3-dibenzyl-imidazolidone-cis-4,5-dicarboxylic acid, 150 grams zinc dust, 100 grams zinc powder (40 mesh), 1500 cc. acetic anhydride and 500 cc. acetic acid is stirred and refluxed for 10-15 hours. The dicarboxylic acid (IV) can be used instead of the anhydride. In that case the acid is first mixed with the acetic anhydride, refluxed for 10 minutes and then the other constituents are added. The amounts of acetic acid and anhydride can be reduced to about ½ without affecting the yield. If too little is used the yield is reduced. After that time, the mixture is cooled, filtered and the precipitate on the funnel washed with ethyl acetate. The filtrate is concentrated in vacuo, and the oily or partly crystalline residue is treated with ice water and ethyl acetate, until all the organic substance is dissolved. The ethyl acetate layer is washed with water, dried with sodium sulfate and concentrated in vacuo. The oily or partly crystalline residue is boiled up with acetic anhydride, in order to reconvert any of the compound decomposed during the treatment with water into the cyclic acetate. The mixture is again concentrated in vacuo. Xylene is then added to the residue, and part of it is distilled off in vacuo, then ether and petrol-ether are added. The reaction product separates in fine needles or prisms, which melt at 103–104°. After drying the melting point is 124–125°.

*1,3-dibenzyl-cis-4-carboxy-5-formyl-imidazolidone-2 (VIa)*

An excess of 3 N sodium hydroxide solution is added to a solution of the acetate of the cyclic form of 1,3-dibenzyl-cis-4-carboxy-5-formyl-imidazolidone-2 (VI) in dioxane. After 2 minutes the mixture is acidified with dilute sulfuric acid and extracted with ether. The ether extract is washed, dried with sodium sulfate, and concentrated in vacuo. The residue is recrystallized from a mixture of acetone, ether and petrol-ether.

The free aldehydo acid (VIa) crystallizes in colorless needles or prisms melting at 109–110°. It forms a 2,4-dinitrophenylhydrazone, which crystallizes from a mixture of dioxane, benzene and petrol-ether in orange prisms melting at 223.5–224.5°.

The free aldehydo acid (VIa) can be reconverted into the acetate of the cyclic form (VI) by treating it with acetic anhydride or acetyl chloride.

*Thiolactone of 1,3-dibenzyl-cis-4-carboxy-5-mercaptomethyl-imidazolidone-2 3,4-(1',3'-dibenzyl-2'-keto-imidazolido)-2-keto-thiophane (VII)*

A. A vigorous stream of hydrogen chloride and hydrogen sulfide is passed through a suspension of 150 grams of the acetate of the cyclic form of 1,3-dibenzyl-cis-4-carboxy-5-formyl-imidazolidone-2 (VI) in 850 cc. absolute alcohol cooled to −10 to −20°. After about 1½ hours, most of the starting material is dissolved. To complete the reaction, hydrogen chloride and hydrogen sulfide are passed through the solution for another hour. The solution is then concentrated in vacuo, at the lowest possible temperature and with exclusion of moisture. Some toluene is added to the residue and distilled off in vacuo, thus removing most of the hydrogen chloride still present.

B. A vigorous stream of hydrogen chloride and hydrogen sulfide is passed through a solution of 150 grams 1,3-dibenzyl-cis-4-carboxy-5-formyl-imidazolidone-2 (VIa) in 850 cc. absolute alcohol cooled to −10 to −20°. After 2½ hours the solution is concentrated in vacuo at the lowest possible temperature and with exclusion of moisture. Some toluene is added to the residue and distilled off in vacuo, thus removing most of the hydrogen chloride still present.

C. The residual oil from reaction A or reaction B is dissolved in 1200 cc. of a suspension of potassium hydrosulfide in alcohol. (This suspension is prepared by saturating a mixture of 672 grams potassium hydroxide and 4 liters of alcohol with hydrogen sulfide.) The mixture is left at room temperature for 15 hours, then refluxed for 1 hour, poured on ice and acidified with dilute sulfuric acid. The organic part is extracted with ether, the solution is dried with sodium sulfate and concentrated in vacuo. The residue is reduced in a stirred refluxing mixture of 900 grams zinc dust, 150 grams granulated zinc (20 mesh) and 2.3 liters acetic acid. After 4 hours, the solution is filtered, and the mixture of zinc and zinc acetate remaining on the funnel is washed with ether and water. The filtrate is concentrated in vacuo and diluted with ether and 40% sulfuric acid until clear separation takes place. The ether layer is separated, washed with water and concentrated in vacuo to a small volume. After 24–48 hours the mixture becomes crystalline. It is then diluted with some more ether and filtered. Melting point 123–124°.

The thiolactone can be recrystallized from a mixture of acetone, ether and petrol-ether. The pure compound forms colorless plates melting at 126–127°. It is soluble in strong alkali, and gives a positive mercaptan test with sodium nitroprusside.

*3,4-(1',3'-dibenzyl-2'-keto-imidazolido)-2-hydroxy-2-(ω-methoxybutyl)-thiophane (VIII) or 1,3-dibenzyl-cis-4-mercaptomethyl-5-(ω-methoxy-valeryl)-imidazolidone-2 (VIIIa)*

A Grignard solution prepared from 8.3 grams (50 m. moles=6.5 cc.) 4-methoxybutylbromide and an excess of magnesium (2.4 grams) in 15 cc. ether and 5 cc. benzene is diluted with benzene, poured off the unreacted magnesium and added dropwise (in about 30 minutes) to a boiling, stirred solution of 13.5 grams (40 m. moles) of the thiolactone (VII) in 160 cc. benzene. The solution is then kept refluxing for another 2½ hours. The mixture is decomposed with ice and dilute sulfuric acid, the organic layer is separated and concentrated in vacuo. The residue is dissolved in methanol and heated to 50° C. with an excess of aqueous sodium carbonate solution. Ether and water are added, and the two layers separated. The alkaline aqueous solution contains the unreacted thiolactone (VII), which is extracted and recovered after acidification (1.0 gram). The ether layer, containing the reaction product, is dried, and concentrated in vacuo. The residue is recrystallized from ether, petrol-ether.

The product is soluble in strong alkali and gives a positive mercaptan test with sodium nitroprusside. It can be recrystallized from a mixture of acetone, ether and petrol-ether. Prisms. Melting point 110.5–112° C.

*3,4-(1',3'-dibenzyl-2'-keto-imidazolido)-2(ω-methoxy-butylidene)-thiophane (IX)*

A solution of 20.0 grams of the above described compound (VIII⇌VIIIa) in 100 cc. acetic acid is is refluxed for 1½ hours. The solution is concentrated in vacuo, the residue is dissolved in ether and the solution is washed with dilute sodium carbonate solution. The ether solution is dried and concentrated in vacuo. The oily residue represents the unsaturated ω-methoxy-butylidene compound (IX).

*3,4-(1',3'-dibenzyl-2'-keto-imidazolido)-2-(ω-methoxybutyl)-thiophane (X)*

The oily ω-methoxy-butylidene compound (IX), obtained in the previous experiment, is dissolved in 150 cc. methanol and hydrogenated in presence of 4 grams prehydrogenated palladium oxide at room temperature and atmospheric pressure. The calculated amount of hydrogen is taken up in 30 hours, the catalyst is filtered off and the solution is concentrated in vacuo. The time required for the hydrogenation depends on the purity of the product and varies therefore. Other palladium catalysts, for example Pd-charcoal and Pd-barium sulfate, can also be used. The hydrogenation product solidifies after a few days. It has a low melting point and is difficult to recrystallize. The crude compound is therefore used for the next step. Pure crystalline preparations can be obtained by slow recrystallization from petrol-ether.

*3,4-(N-monobenzyl-2'-keto-imidazolido)-2-(ω-methoxybutyl)-thiophane (XI)*

A solution containing 6.84 grams (16.8 moles) of the crude ω-methoxybutyl compound (X) in 20–30 cc. xylene is added to 20–30 cc. of liquid ammonia cooled in a dry ice bath. To the stirred mixture is added sodium (in form of small pieces) until the blue color persists (about 34 m. moles=0.78 gram sodium are used). The last excess of sodium is destroyed with ammonium chloride, the ammonia is evaporated, and dilute sulfuric acid and ether are added. The mixture is stirred for a while and then filtered. The bulk of the reaction product remains on the funnel; a smaller part is dissolved in the ether layer of the filtrate. The latter is separated (if some product precipitates ethylacetate is added), dried and concentrated in vacuo. The residue is recrystallized from acetone-ether, together with the product obtained by filtration.

The product can be recrystallized from a mixture of acetone, ether and petrol-ether, yielding fine needles melting at 143–144°.

*3,4-(N-benzyl-2'-keto-imidazolido)-2-(ω-bromobutyl)-thiophane (XII)*

A solution of 4.6 grams 3,4-(N-benzyl-2'-keto-imidazolido)-2-(ω-methoxybutyl)-thiophane in 40 cc. of 48% hydrogen bromide in acetic acid is heated in a sealed tube to 90° (bath temperature) for 45 minutes. The purple solution is concentrated in vacuo, the residue dissolved in ethyl acetate, and treated with water. Ether is added to the mixture, and the precipitated crystalline bromo-compound filtered off, and washed with water and ether.

The filtrate is diluted, if necessary, with some ethylacetate to dissolve some newly precipitated material. The organic layer is then separated and concentrated in vacuo. The crude material on the funnel and the residue from the organic layer are combined and used for the next step. The bromo-compound can be purified by dissolving the crude material in acetone or methanol. Ether and petrol-ether are added to such a solution to precipitate some dark impurities. The filtered solution is then concentrated, until crystallization begins. After some standing, ether is added, and the precipitated needles are filtered off. Melting point 168–169°.

*3,4-(N-benzyl-2'-keto-imidazolido)-2-(ω-cyanobutyl)-thiophane (XIII)*

A solution of 5 grams potassium cyanide in 15 cc. water is added to a solution of 4.5 grams of the crude bromo-derivative (XII) in 200 cc. methanol. The mixture is refluxed for 20 hours, concentrated in vacuo, and the residue treated with water and ether. The precipitated nitrile is filtered off, and the aqueous solution extracted with ethyl acetate. The organic layer is concentrated in vacuo, the residue combined with the precipitated material, and used together for the next reaction. The nitrile can be recrystallized from a mixture of methanol, ether and petrol-ether, yielding needles, melting at 169.5–171°.

*3,4-(N-benzyl-2'-keto-imidazolido)-2-(ω-carboxybutyl)-thiophane; N-benzyl-d,l-biotin (XIV)*

The crude nitrile (XIII) from the preceding experiment is dissolved in a mixture of 300 cc. methanol and 150 cc. 3 N aqueous potassium hydroxide, and heated on the steam-bath for 24 hours. The mixture is concentrated in vacuo, and the residue treated with water and ether. The precipitate is filtered off, and the alkaline solution extracted in the cold with some ethyl acetate. Some unchanged nitrile can be recovered from the precipitate and the ethyl acetate extract. The alkaline aqueous solution is then acidified, and the precipitated N-benzyl-d,l-biotin filtered off. The mother liquors are extracted with ethyl acetate, to yield another smaller portion of the reaction product. The product crystallizes very well from methanol, if necessary with the addition of some ether. Thin plates, melting at 175–176°.

The methyl ester was prepared by reacting the free acid in methanol with a diazo-methane solution in ether. The ester can be recrystallized from a mixture of methanol, ether and petrol-ether. Fine needles melting at 169.5–170.5°.

*d,l-Biotin*

1.45 grams (=4.27 m. moles) pulverized monobenzyl-biotin are suspended in about 100 cc. liquid ammonia. Sodium is added in small pieces, until a persistent blue color appears (about 13–17 m. moles=0.3–0.4 gram of sodium are needed). The ammonia is evaporated, and ice, ether and dilute hydrochloric acid are added to the residue. The acid solution is filtered, and the residue on the funnel dissolved in a large amount of hot water and hot ethyl acetate or chloroform. These solutions are mixed with the first filtrate, and the two layers are separated. The ethyl acetate or chloroform layer contains the unchanged starting material. The aqueous part contains all the d,l-biotin formed and inorganic salts. It is concentrated in vacuo, and the precipitated d,l-biotin is filtered off. The biotin is obtained in form of fine needles melting at 228–230°. The sample for analysis was purified by dissolving in 20 parts hot 80% acetic acid and diluting the solution with the equal amount of water. Fine needles melting at 232–234°.

Anal. Calcd. for $C_{10}H_{16}O_3N_2S$: C, 49.16; H, 6.60%. Found: C, 49.33; H, 6.49%.

It will be understood that in carrying out our new biotin synthesis, as disclosed herein, the nature of the intermediates can be varied within the scope of the known art. Thus, instead of the acetate of the cyclic form of 1,3-dibenzyl-cis-4-carboxy-5-formyl-imidazolidone-2 (VI), the corresponding homologous lower aliphatic acyl-derivatives can also be used, e. g., the propionate or the butyrate. These acyl-derivatives can be prepared in the same way as the acetate, viz., by carrying out the reduction of the anhydride (V) of the 1,3-dibenzyl-imidazolidone-(2)-cis-4,5-dicarboxylic acid with zinc in the presence of the corresponding lower aliphatic acid and its anhydride. Furthermore, instead of using ω-methoxybutylmagnesium bromide for the introduction of the butyl side chain into 3,4-(1',3'-dibenzyl-2' - keto - imidazolido) - 2 - keto - thiophane (thiolactone VII), organo-metal derivatives of other lower ω-alkoxy-butyl-halogenides can be employed as well for the same purpose.

It will also be understood that the specification and claims embrace all tautomeric forms of the compounds named or shown. Moreover, it will be understood that the monobenzyl compounds, described herein, contain the benzyl group either in the 1' or 3' position, the formulae showing the benzyl in a fixed position merely for the sake of convenience.

We claim:

1. Compounds of the general formula

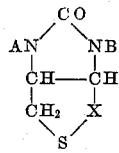

wherein A and B are members of the group consisting of hydrogen and benzyl, there being at least one benzyl substituent, and X is a member of the group consisting of =CO
=C(OH)-alkoxyalkyl
=C=CH-alkoxyalkyl
=CH-alkoxyalkyl
=CH-halogenoalkyl
=CH-cyanoalkyl
=CH-carboxyalkyl 2. 3,4 - (N-benzyl - 2' - keto - imidazolido) - 2- (ω-bromobutyl)-thiophane.

3. 3,4 - (N - benzyl - 2' - keto - imidazolido) - 2-(ω-cyanobutyl)-thiophane.

4. N-benzyl-d,l-biotin.

5. Process for producing d,l-biotin which comprises reacting meso-bis-benzylamino-succinic acid with phosgene to form 1,3-dibenzyl-imidazolidone-(2)-cis-4,5-dicarboxylic acid, converting said compound to its anhydride, reducing said anhydride in the presence of an anhydride of a lower aliphatic acid to yield a corresponding 3,4 - (1',3' - dibenzyl-2' - keto-imidazolido) - 2-keto-5-acyloxy-tetrahydrofurane, converting the latter compound to 3,4-(1',3'-dibenzyl-2'-keto-imidazolido)-2-keto-thiophane, treating the 3,4-(1',3' - dibenzyl - 2' - keto-imidazolido)2 - keto-thiophane with an ω - alkoxybutyl - magnesium halogenide to form a 3,4-(1',3'-dibenzyl-2'-keto-imidazolido) - 2 - hydroxy-2 - (ω - alkoxybutyl)-thiophane, splitting out one molecule of water from said last mentioned compound to yield a 3,4 - (1',3' - dibenzyl - 2'-keto-imidazolido) - 2-(ω-alkoxybutylidene) - thiophane, hydrogenating said unsaturated compound to a 3,4-(1',3'-dibenzyl - 2' - keto - imidazolido) - 2 - (ω-alkoxybutyl)-thiophane, thereafter removing one benzyl group to yield a 3,4-(N-monobenzyl-2'-keto-imidazolido) - 2 - (ω-alkoxybutyl) - thiophane, and converting said latter compound into a corresponding compound of the group consisting of those having in place of the alkoxy radical a member selected from the group consisting of halogeno, cyano, and carboxy, and eliminating the benzyl group from the carboxy compound by reductive cleavage.

6. In a process of producing d,l-biotin, the steps which comprise converting a compound selected from the group consisting of 3,4-(1',3'-dibenzyl - 2' - keto - imidazolido) - 2 - keto - 5-acyloxy-tetrahydrofuranes, the acyl being lower aliphatic, and the corresponding free aldehyde 1,3 - dibenzyl - cis - 4 - carboxy - 5 - formyl-imidazolidone-2, to 3,4-(1',3'-dibenzyl-2'-keto-imidazolido)-2-keto-thiophane, followed by treating the 3,4-(1',3' - dibenzyl-2' - keto - imidazolido)-2-keto-thiophane with an ω-alkoxybutyl-magnesium halogenide, to form a 3,4-(1',3'-dibenzyl-2' - keto - imidazolido) - 2 - (ω - alkoxybutyl)-thiophane, splitting out one molecule of water from said compound to yield a 3,4-(1',3'-dibenzyl - 2' - keto - imidazolido) - 2 - (ω-alkoxybutylidene)-thiophane, hydrogenating said unsaturated compound to a 3,4-(1',3'-dibenzyl-2'-keto - imidazolido) - 2 - (ω - alkoxybutyl)-thiophane, thereafter removing one benzyl group to yield a 3,4-(N-monobenzyl-2'-keto-imidazolido)-2-(ω-alkoxybutyl)-thiophane, and converting said latter compound into a corresponding compound of the group consisting of those having in place of the alkoxy radical a member selected from the group consisting of halogeno, cyano, and carboxy.

7. Process which comprises eliminating the benzyl group from N-benzyl-d,l-biotin by reductive cleavage.

8. Process of claim 7 involving the use of sodium in liquid ammonia.

MOSES WOLF GOLDBERG.
LEO H. STERNBACH.

No references cited.

Certificate of Correction

Patent No. 2,489,232 — November 22, 1949

MOSES WOLF GOLDBERG ET AL.

It is hereby certified that errors appear in the printed specification of the above numbered patent requiring correction as follows:

Column 2, Formula IV, for that portion reading  same column, Formula VIIIa, for that portion reading "HSCH$_2$C" read *HSCH$_2$CH*; column 3, line 11, for "3,4(1′,3′-dibenzyl" read *3,4-(1′,3′-dibenzyl*; line 65, for "di-biotin" read *d-biotin*; column 6, lines 60 and 61, for "-2(ω-methoxy-" read *-2-(ω-methoxy-*; line 64, after "acid" strike out "is"; column 10, line 31, for "imidazolido)-2" read *imidazolido)-2-hydroxy-2*;

and that the said Letters Patent should be read with these corrections therein that the same may conform to the record of the case in the Patent Office.

Signed and sealed this 28th day of March, A. D. 1950.

[SEAL]

THOMAS F. MURPHY,
*Assistant Commissioner of Patents.*